United States Patent
Butchers et al.

(10) Patent No.: US 6,637,930 B2
(45) Date of Patent: Oct. 28, 2003

(54) METHOD FOR CALCULATING THE TEMPERATURE RISE PROFILE OF A POWER MOSFET

(75) Inventors: Douglas Butchers, Crowborough (GB); Graham Tickner, Horsham (GB)

(73) Assignee: International Rectifier Corporation, El Segundo, CA (US)

( * ) Notice: Subject to any disclaimer, the term of this patent is extended or adjusted under 35 U.S.C. 154(b) by 48 days.

(21) Appl. No.: 09/967,921

(22) Filed: Oct. 2, 2001

(65) Prior Publication Data

US 2003/0067955 A1 Apr. 10, 2003

(51) Int. Cl.[7] ............................. G01K 1/14; G01K 13/00
(52) U.S. Cl. ........................................ 374/102; 374/152
(58) Field of Search ............................... 374/102, 137, 374/152, 141, 1, 103, 104; 702/99, 33

(56) References Cited

U.S. PATENT DOCUMENTS

| | | | | |
|---|---|---|---|---|
| 3,253,221 A | * | 5/1966 | Peckover ..................... | 374/102 |
| 4,734,641 A | * | 3/1988 | Byrd, Jr. et al. ......... | 324/158.1 |
| 5,119,265 A | * | 6/1992 | Qualich et al. ............. | 361/103 |
| 6,048,094 A | * | 4/2000 | Tornare ...................... | 374/183 |
| 6,052,268 A | * | 4/2000 | Thomas ...................... | 361/103 |
| 6,164,816 A | * | 12/2000 | Aderhold et al. ............... | 374/1 |
| 6,431,749 B1 | * | 8/2002 | Tolant et al. ................ | 374/102 |
| 2002/0075936 A1 | * | 6/2002 | Shibata et al. .............. | 374/141 |
| 2002/0139792 A1 | * | 10/2002 | Nobuhara et al. .......... | 219/494 |
| 2002/0169924 A1 | * | 11/2002 | Osborn ....................... | 711/106 |

* cited by examiner

Primary Examiner—Christopher W. Fulton
Assistant Examiner—Mirellys Jagan
(74) Attorney, Agent, or Firm—Ostrolenk, Faber, Gerb & Soffen, LLP

(57) ABSTRACT

A computer program for calculating temperature rise profiles of a power MOSFET for different current waveforms, either single waveforms or multiple waveforms. The user enters the device part number identifying the device, the device Rdson at maximum temperature, and various calculation data, such as the calculation resolution and thermal resistance coordinates. The user also selects the desired current waveform from a library of waveforms. The program then calculates thermal resistance constants for the device as a function of time, and generates an array of thermal resistance values for each waveform subdivision based on the calculation resolution chosen. The instantaneous power values at each current/time subdivision are then calculated by the program and an array of power X thermal resistance difference terms is generated for each time interval. These terms are then summed to generate the temperature rise profile, and the results are displayed graphically or textually.

14 Claims, 9 Drawing Sheets

Data book log/log thermal resistance curve

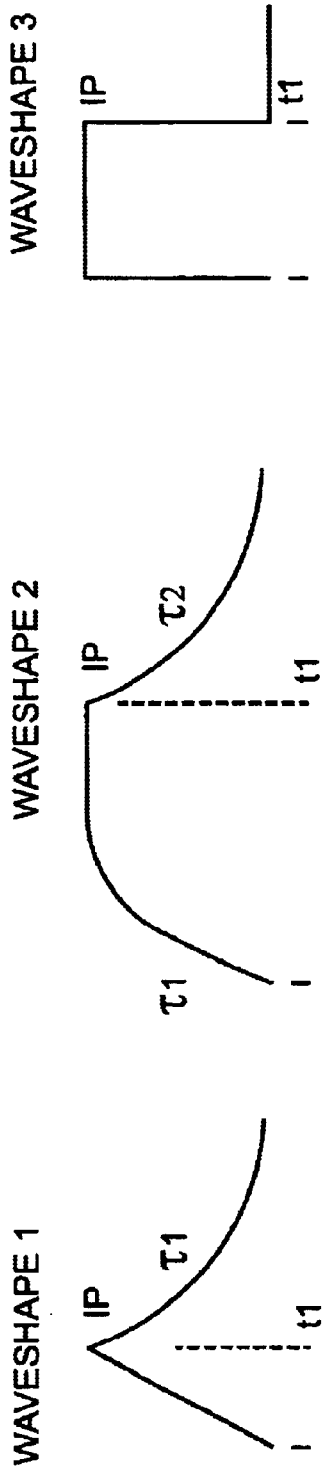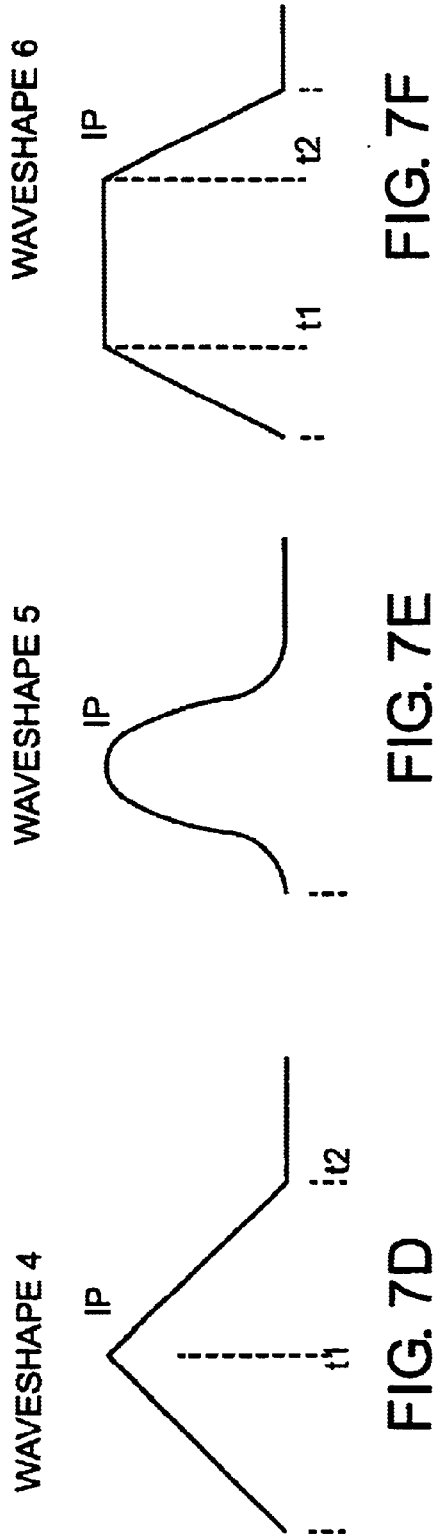

METHOD FOR CALCULATING THE TEMPERATURE RISE PROFILE OF A POWER MOSFET

BACKGROUND OF THE INVENTION

1. Field of the Invention

The present invention relates to a model and method for calculating the temperature of a power MOSFET and, more specifically, to accurately calculating the temperature rise profile of a power MOSFET subjected to a defined current waveform or multiple waveforms.

2. Description of the Related Art

Important considerations in designing and employing a power MOSFET include the amount of power the power MOSFET can handle and the thermal effects generated by the power MOSFET during operation. A power MOSFET can be destroyed if it conducts too much current, because the power MOSFET generates excessive heat due to the extreme current. Increased temperature also can cause deleterious effects with respect to surrounding electronic components or other structures. Accordingly, it is important in any particular application to choose the proper power MOSFET, one that is capable of conducting the current flow for that application without generating excessive heat.

Although it is possible to manually calculate the temperature of a power MOSFET subjected to a simple current load, power MOSFETs typically are subjected to current loads having complex waveforms. Calculation of the temperature rise of a power MOSFET at a time $t_n$ subjected to a current having a complex wave form is difficult if not impracticable. As a result, power MOSFET selections for a particular application typically occur through trial and error.

Accordingly, a need exists for an automated method for calculating the temperature rise profile for a power MOSFET subjected to a defined current wave form.

SUMMARY OF THE INVENTION

The present invention provides a model and method for calculating the temperature rise profile for a power MOSFET subjected to a defined current waveform or a number of these same waveshapes. According to a preferred embodiment, the invention is embodied in the form of a computer program that operates on an industry standard personal computer.

Preferably, the program provides a graphical interface to a user whereby program data inputs can be provided by the user, and calculated data and graphical representations generated by the program model are presented to the user.

The program calculates and produces a graph or a tabular print-out of the temperature profile of the selected power MOSFET based upon data entered by a user. Program inputs relating to the power MOSFET include the device type and the device on resistance Rdson at the maximum device temperature (from the device data sheet), and various calculation data including the number of intervals required for the calculation and thermal resistance coordinates. The user also selects the desired current waveform from a library of waveforms. The program then calculates thermal resistance constants for the selected power MOSFET as a function of time, and generates an array of thermal resistance values for each waveform subdivision (the waveform subdivisions are determined by the number of intervals chosen). The instantaneous power values at each current/time subdivision then are calculated by the program and an array of power× thermal resistance difference terms is generated for each time interval. These terms then are summed to generate the temperature rise profile, and the results are displayed graphically or textually.

Optionally, multiple current pulses of the existing waveshapes can be used.

Other features and advantages of the present invention will become apparent when the following description of the invention is read in conjunction with the accompanying drawings.

BRIEF DESCRIPTION OF THE DRAWINGS

FIGS. 7A–7F are graphical views of current waveforms which a power MOSFET may experience;

DETAILED DESCRIPTION OF THE PREFERRED EMBODIMENTS

Figure 1:
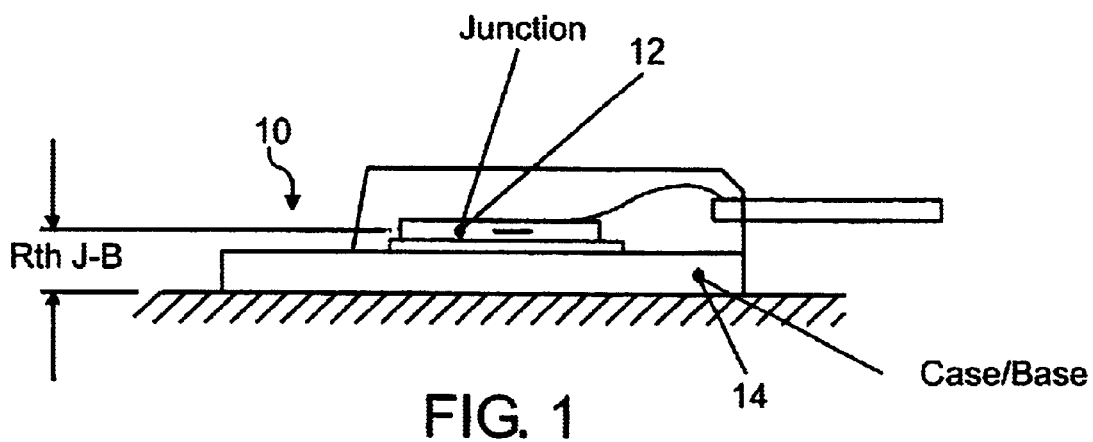
FIG. 1 is a schematic view of a MOSFET.
Figure 2:
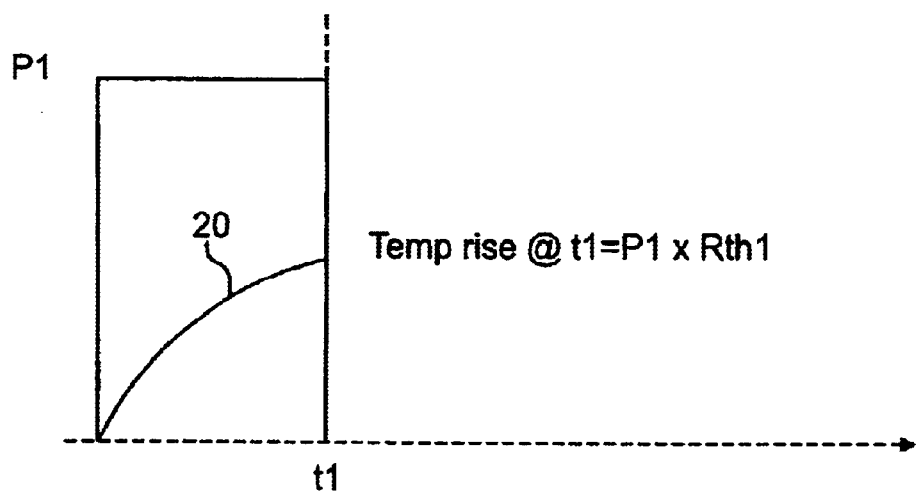
FIG. 2 is a graphical view of a typical temperature rise of a power MOSFET associated with a current input and associated power dissipation.

Referring to FIG. 1, a schematic view of a power MOSFET 10 is shown, including an identification of the junction 12, the base 14, and the junction—base resistance, Rth J-B. When power MOSFET 10 is subjected to a current, the temperature (T) of the MOSFET above the base temperature caused by the current at time $t_1$ may be modeled, as shown in FIG. 2, as a curve 20 calculated using the following equation:

$$T_1 = P_1 \times Rth_1 \qquad (1)$$

where $T_1$ represents the temperature at time $t_1$, $P_1$ represents the power at time $t_1$, and Rth represents the thermal resistance (junction to base) of the power MOSFET at time $t_1$. Usually T is measured in degrees Celsius, P in watts, and Rth in degrees Celsius per watt (° C./W).

Figure 3:
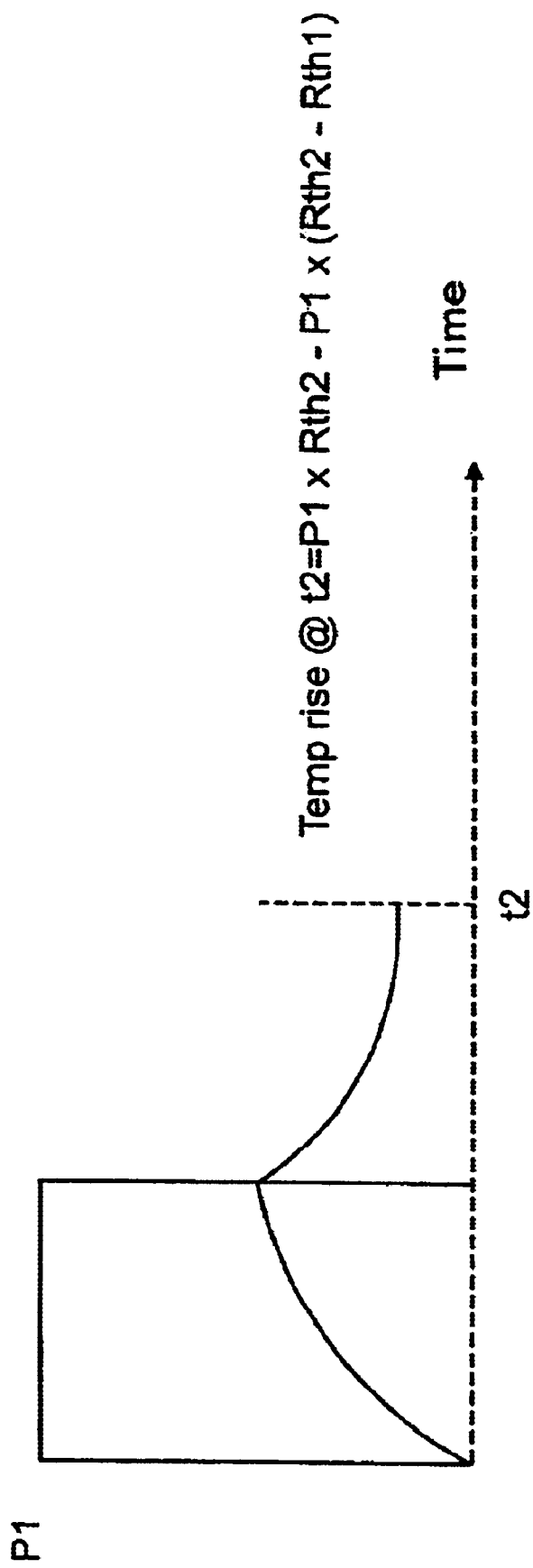
FIG. 3 is a graphical view of a typical temperature rise and fall of a power MOSFET associated with a current input and associated power dissipation.

Referring to FIG. 3, the temperature of the power MOSFET at time $t_2$ may be modeled and calculated as:

$$T_2 = P_1 \times Rth_2 - P_1 \times (Rth_2 - Rth_1) \qquad (2)$$

Figure 4:
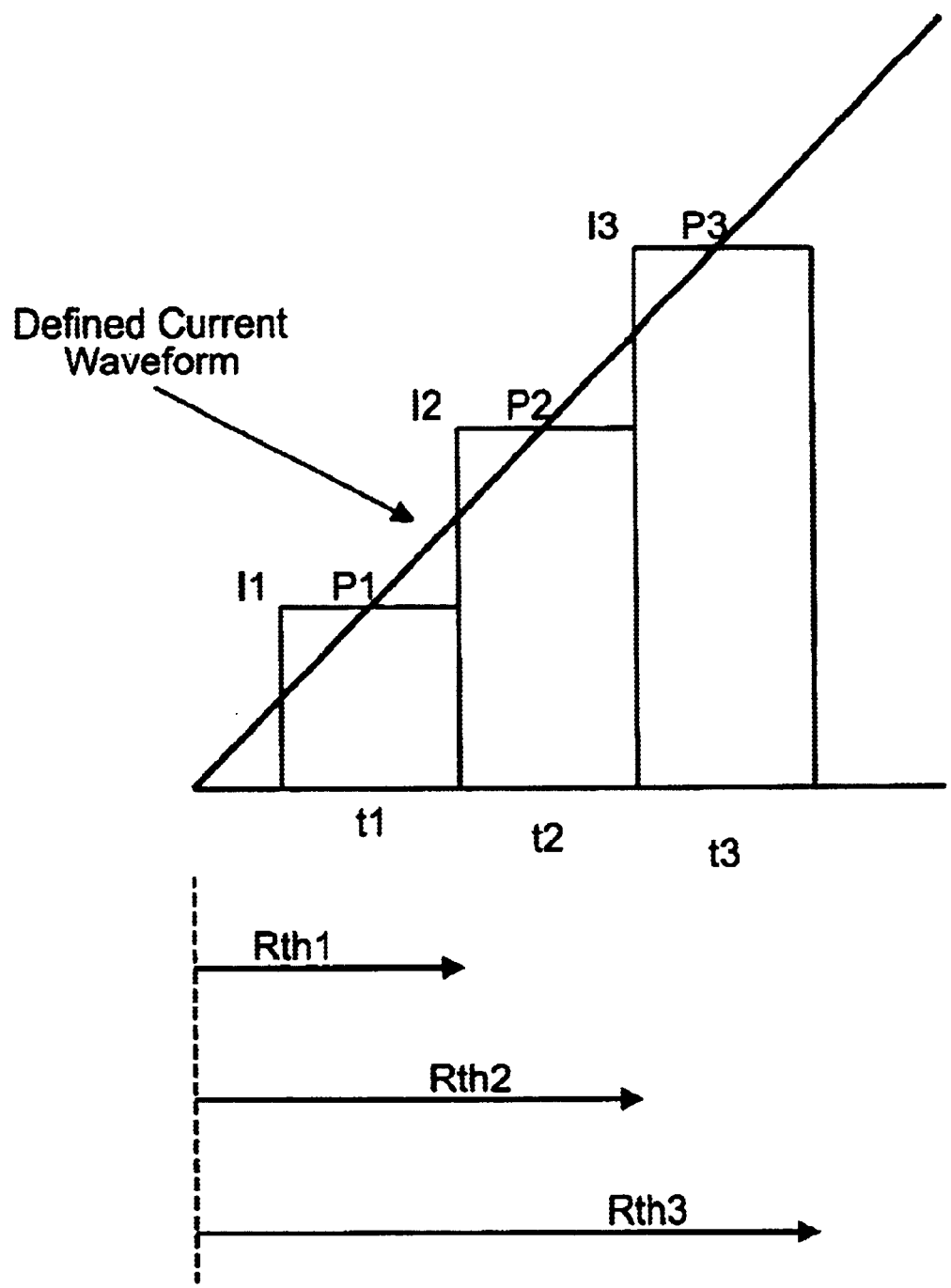
FIG. 4 is a graphical view of the current waveform for approximating the temperature rise of a power MOSFET subjected to three sequentially increasing currents.

The foregoing models and expressions are based on a simple step input of power $P_1$. However, in many cases the power input changes, linearly or non-linearly. For example, in FIG. 4, the power MOSFET is subjected to currents $I_1$, $I_2$, and $I_3$ having corresponding power levels $P_1$, $P_2$, and $P_3$. The current inputs $I_1–I_3$ result in an average current waveform 22. As with the foregoing example, the temperature of the MOSFET at time $t_1$ may be determined from expression (1) above. Subsequent temperatures are calculated by summation of expressions for temperature associated with the power level $P_N$ at time $t_N$. Thus, at time $t_2$, the temperature rise $T_2$ of the device is calculated with expression (2) above. At time $t_3$, the temperature of the device is calculated with the following expression:

$$T_3=(P_1 \times Rth_3-P_1 \times Rth_2)+(P_2 \times Rth_2-P_2 \times Rth_1)+(P_3 \times Rth_1) \qquad (3)$$

A generalized formula for determining the temperature of a MOSFET energized by a current having any waveform may be expressed as:

$$T_n=P_1(Rth_n-Rth_{n-1})+P_2(Rth_{n-1}-Rth_{n-2})+P_3(Rth_{n-2}-Rth_{n-3})+ \ldots \\ +P_nRth_1 \qquad (4)$$

where $T_n$ is the temperature rise of the junction at the nth interval, $P_n$ is the instantaneous power in the power MOSFET at the nth interval, and $R_n$ is the thermal resistance at the time associated with the mid-point of the nth interval.

Figure 5:
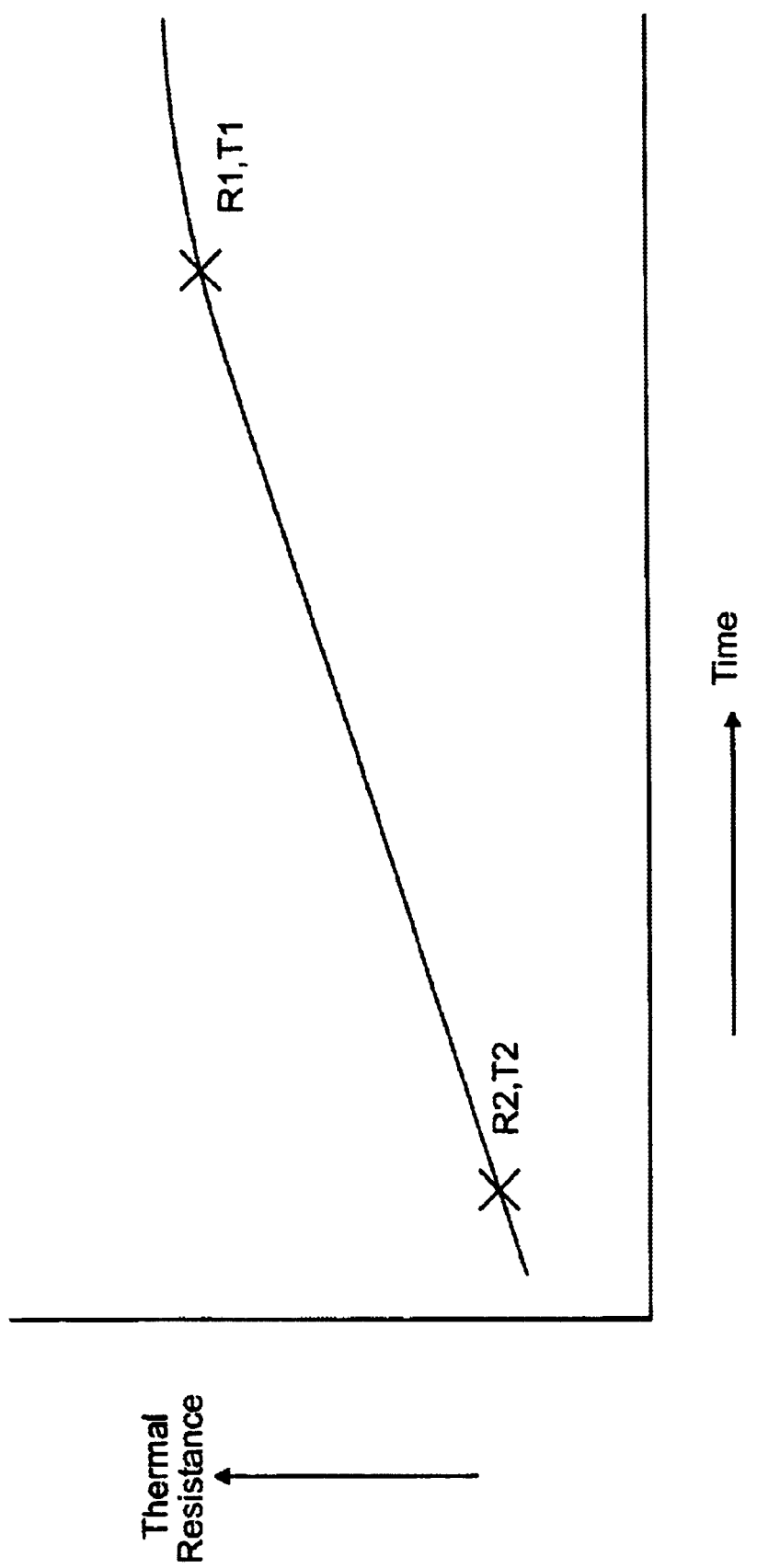
FIG. 5 is a graphical view of a typical thermal resistance curve for a power MOSFET.

As noted above, power MOSFET thermal resistance depends on the temperature of the power MOSFET. FIG. 5 shows a logarithmic curve 24 relating power MOSFET resistance to time. This resistance curve may be defined by:

$$\text{Log } Rth = Y_t \times \log T + \log X_t \qquad (5)$$

Solving for the constants $Y_t$ and $X_t$ yields:

$$Y_t = \frac{\log R(\text{th})_1 - \log R\text{th}_2}{\log T_1 - \log T_2} \qquad (6)$$

$$X_t = \frac{R\text{th}}{T^{Y_t}} \qquad (7)$$

Thus, the thermal resistance at any time t may be ascertained with:

$$Rth(t) = X_t \times T^{Y_t} \qquad (8)$$

Consequently, the temperature of a power MOSFET at any time t(n) may be determined.

The accuracy of calculating the temperature rise of a power MOSFET for a waveform depends on the complexity of the waveform and the number of intervals along the waveform. The more complex the waveform and the smaller the intervals (greater resolution), the more difficult and time-consuming the temperature rise calculation becomes.

Figure 6:
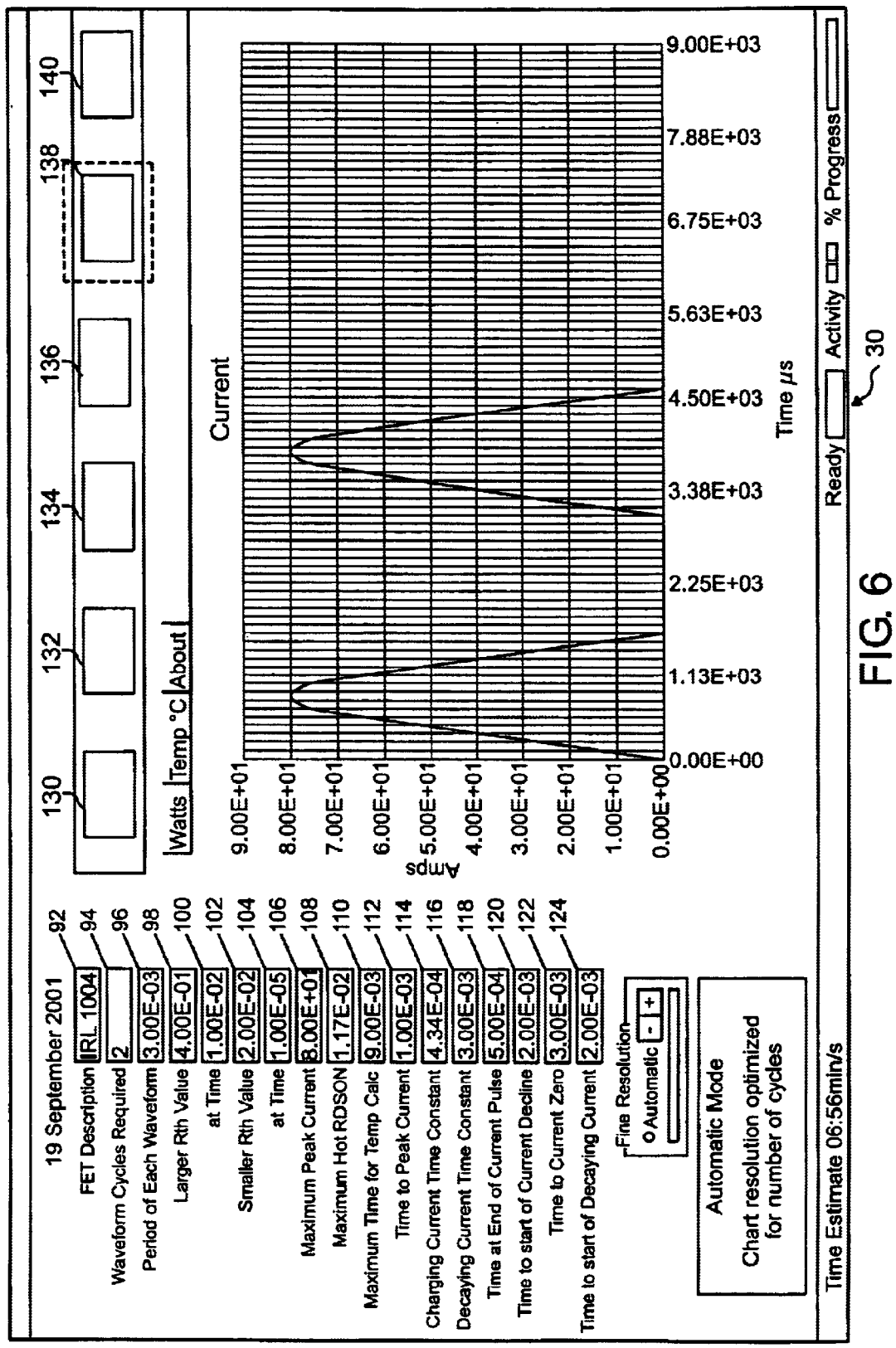
FIG. 6 is a display view of a screen output according to the present invention.

To accurately model the temperature rise of a power MOSFET, the invention provides an input screen 30 shown in FIG. 6 for inputting data pertaining to the characteristics of a power MOSFET and specifying parameters for the type of calculation to be performed. These inputs include, for example, device type; power MOSFET resistance when conducting current at maximum temperature, or Rdson (@ Tj max); input current waveform shape, which may be selected from a library of waveforms; number of intervals required for calculation; and thermal resistance coordinates selected from a device data sheet. The invention receives and processes the data provided to determine values for temperature, current, and power at discrete time intervals, and generates graphs of the values.

Program Functionality

In general, the program of the present invention functions by calculating constants to express thermal resistance as a function of time. An array of thermal resistance values is calculated for each waveform subdivision. From this array, an array of thermal resistance difference terms $R_N-R_{N-1}$ is calculated for the number of intervals chosen. The instantaneous power values at each current/time subdivision of the waveform are calculated using the current expression as defined by the user. From these values, an array of power (P)×thermal resistance (Rth) difference terms is generated for all N time intervals ($P_1 \times (R_N-R_{N-1})$ to $P_N \times R_1$). All of the terms are summed for temperature rise for each time interval according to the general formula (Eq. 4). The program then generates graphs and/or tabular listings of the results.

Referring to FIGS. 7A–7F, a user may select an input current waveform having one of a variety of shapes. The library of waveforms from which the user may select can be extended to include additional waveforms. The invention may be adapted to include transient responses to a variety of heat sinks. The invention also can be adapted to provide the user with the ability to recall previous calculations for comparative purposes. It will be evident to those of skill in the art that the program can be used or be adapted for use on other device technologies, e.g., IGBTs, diodes, etc.

Program Flowchart

Figure 8:
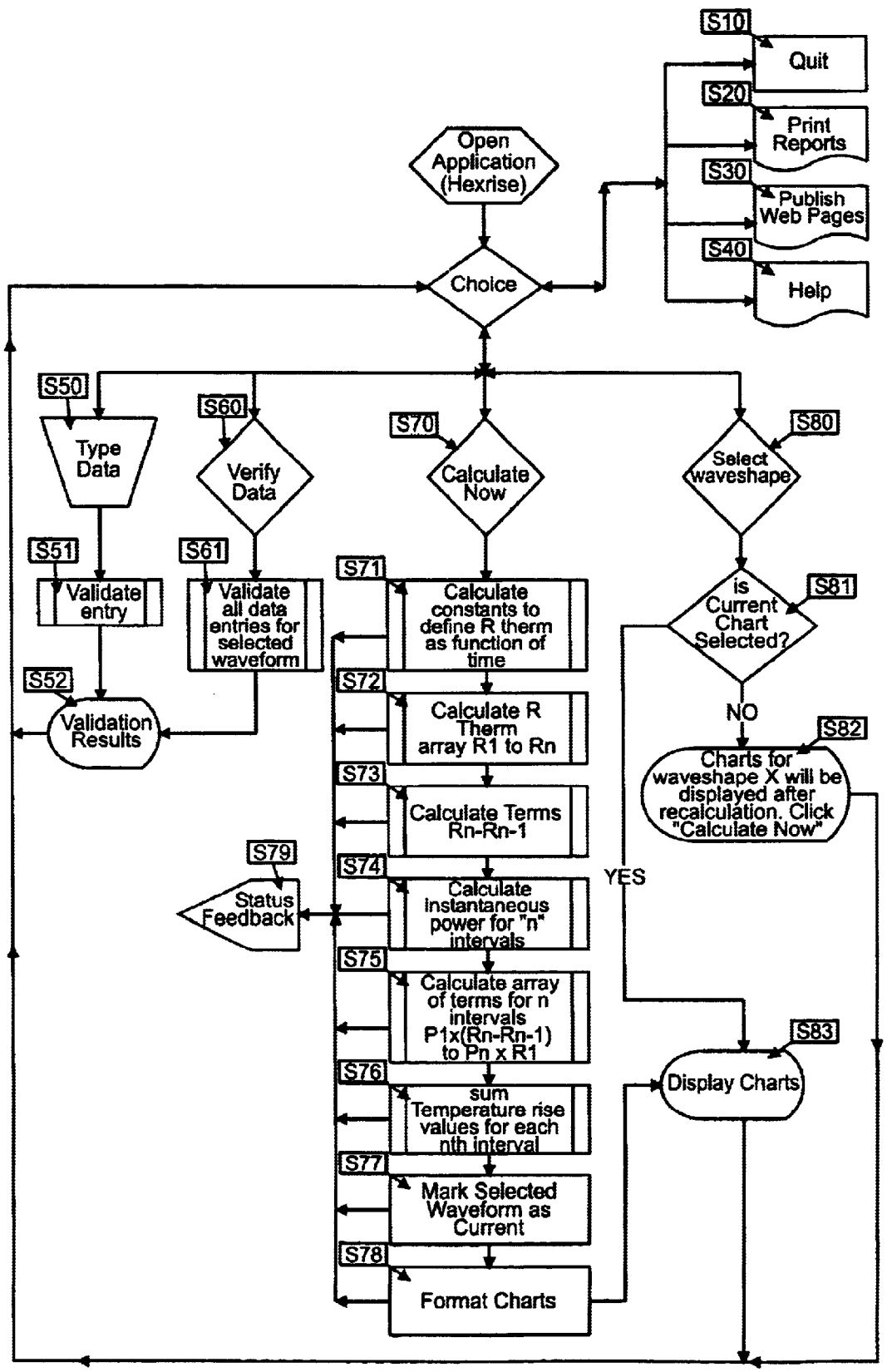
FIG. 8 is a flow diagram of a method according to the invention.
Figure 9:
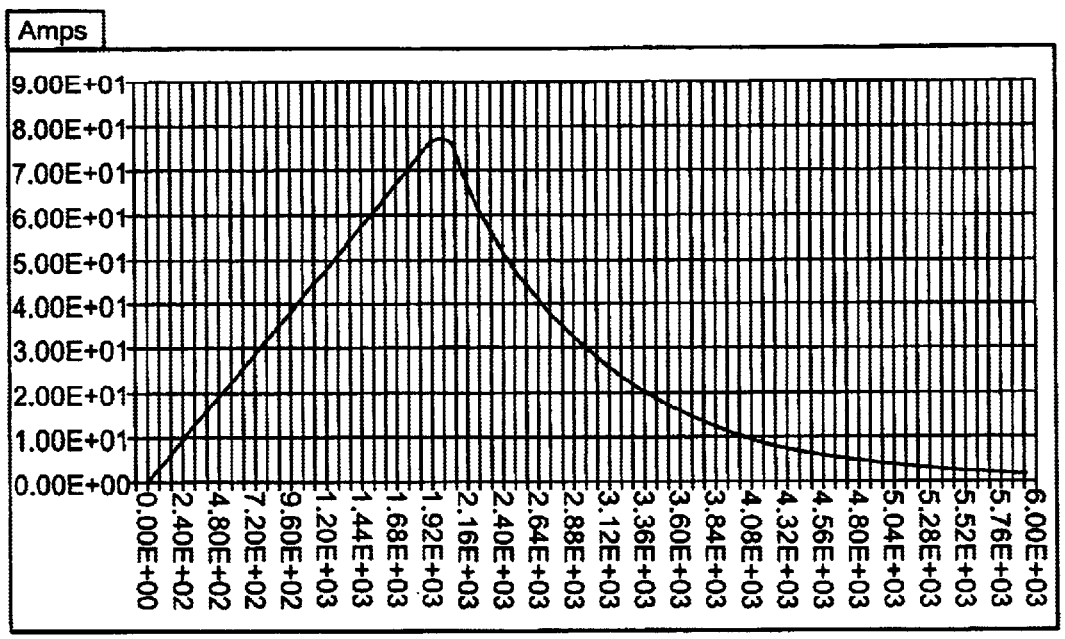
FIG. 9 is a printout view of a graph illustrating the current profile summary of a power MOSFET.

A computer program for implementing the present invention is represented by the flowchart shown in FIG. 8.

First, the user starts the program application (Hexrise) and is presented with a single sovereign application display, maximized on the screen. The application is not a traditional procedural computer program where one step necessarily follows the previous (unless otherwise indicated by indentation below) but is rather a collection of options grouped on a single screen. The user may select any of these options at any time during the operation:

S10 Quit (single click)
   Application terminates
S20 Print Reports (single click)
   Reports are printed to the default Windows printer
S30 Publish Web Pages (single click)
   Web pages—formatted in HTML with navigational structure—are saved to the user's hard drive. The user's web browser is initiated and the saved web pages are displayed independent of Hexrise. These pages may be uploaded to a web site using appropriate authoring tools (not included)
S40 Get Help (single click)
   The user's web browser is initiated and system of helpful web pages are loaded independent of Hexrise. The user may continue to operate Hexrise
S50 Type Data (manual entry)
   S51—Validation is performed on the data entry—checked against pre-defined rules (computed)
   S52—Results of the validation process are displayed and helpful suggestions on how to improve the reliability of the calculation are displayed if necessary (computed)
S60 Verify All Data (single click)
   S61—Validation is performed against all data entries for the selected waveform—checked against pre-defined rules (computed)
S70 Calculate Now (single click) initiates the calculation process
   S71—Calculate constants to Rtherm as function of time (computed)
   S72—Calculate Rtherm array R1 to Rn (computed)

S73—Calculate terms Rn—Rn-1 (computed)

S74—Calculate Instantaneous Power for "n" intervals (computed)

S75—Calculate array of terms for n intervals (computed)

S76—Sum temperature rise values for each nth interval (computed)

S77—Mark selected waveform as current (computed)

S78—Format the chart data (computed)

S79—Status feedback of calculation progress (computed)

S80 Select a Waveform (single click)

S81—When a Waveform is selected by clicking the corresponding library button 1–6, Hexrise checks to see if the charts being displayed match the selection (computed)

S82—If the selected Waveform does not match the currently displayed chart—then all charts are hidden and instead a message ("Charts for Waveform X will be displayed after re-calculation. Click 'Calculate Now'") is displayed (computed)

S83—Otherwise charts are displayed (computed)

The program can be run on a variety of platforms, such as an IBM compatible personal computer or workstation. Typical minimum requirements: a Pentium III or equivalent processor running at 500 MHz with 128 MB of RAM.

EXAMPLE

Figure 10:
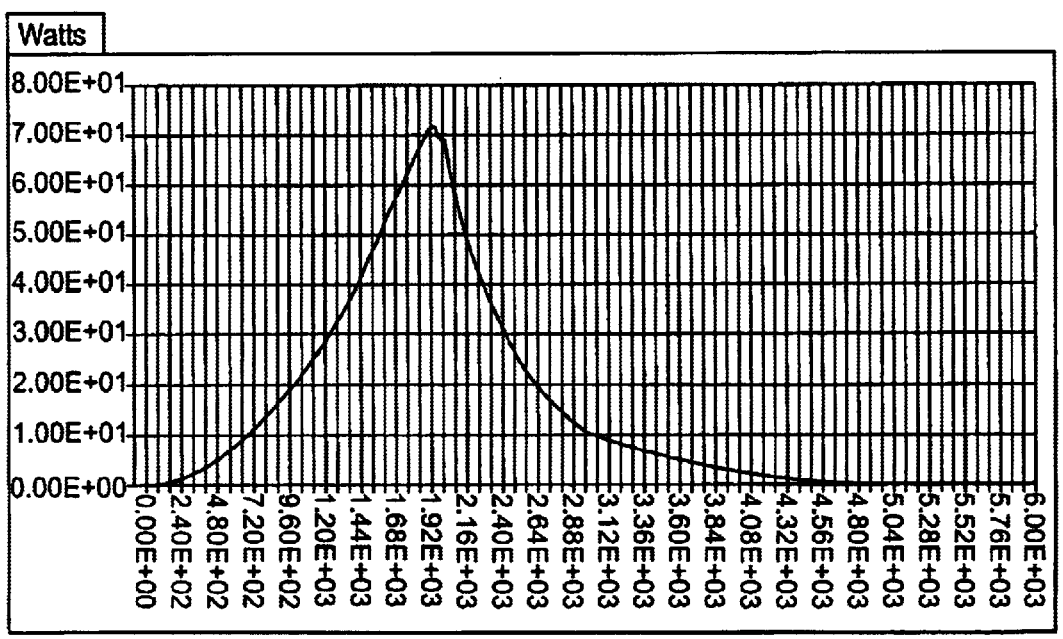
FIG. 10 is a printout view of a graph illustrating the power profile summary of a power MOSFET.
Figure 11:
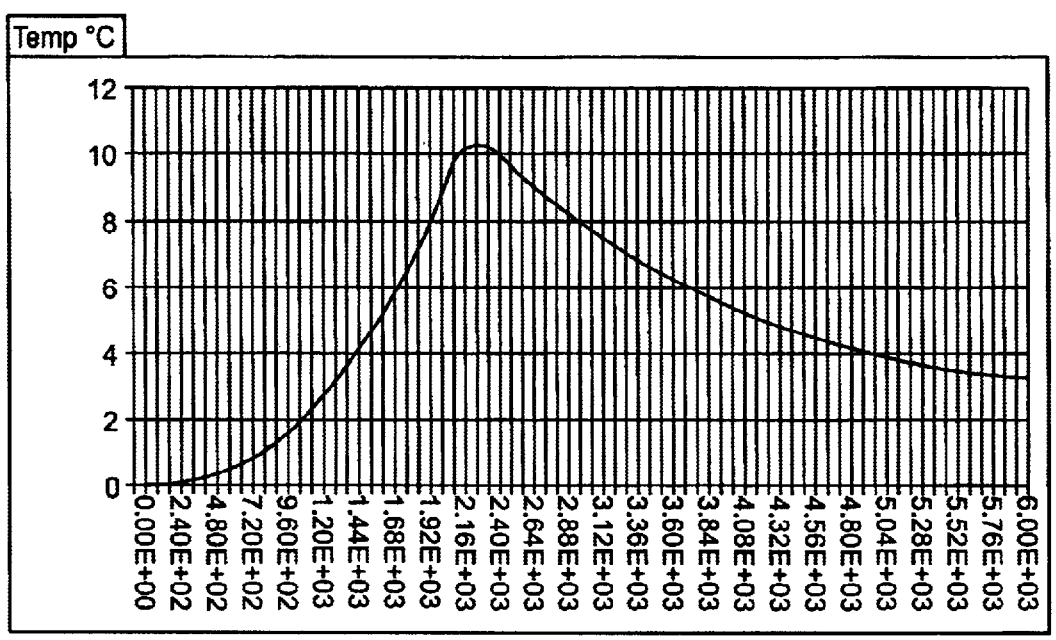
FIG. 11 is a printout view of a graph illustrating the temperature rise profile of a power MOSFET.

FIG. 6 shows display screen 30 generated by a computer program according to the invention. A user may enter various inputs into the data boxes 92–124 as discussed below. The data required depends on the input waveform(s) (FIGS. 7A–F) desired for analysis from the waveforms 130–140 shown on the display. The resultant temperature rise curve is displayed in the form of a curve in a graphical display area of the display 30. The display also shows a current profile summary, including the peak temperature rise, and the temperature at specified times (see FIG. 10). The user may elect to view corresponding power and temperature profiles (FIGS. 11–12) as well.

In the present example, the following data inputs are used:

| Device type: | IRL1004 |
|---|---|
| Maximum Peak current: | 80A |
| Maximum Hot Rdson: | $1.17 \times 10^{-2} \Omega$ |
| "Manual" resolution | On |
| Waveform #: | 5 (FIG. 7E) |
| Maximum time for temp calculation: | $9 \times 10^{-3}$ sec. |
| Thermal resistance inputs: | |
| Larger Rth value: | $4 \times 10^{-1}$ |
| Smaller Rth value: | $2 \times 10^{-2}$ |
| Larger time co-ordinate: | $1 \times 10^{-2}$ |
| Smaller time co-ordinate: | $1 \times 10^{-5}$ |
| Waveform cycles required: | 2 |
| Period of each waveform: | $3 \times 10^{-3}$ |

Not all inputs are required for all waveforms calculations. When a particular input is not required, entry of data into the field is not indicated or allowed.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of calculating a temperature rise profile for a power MOSFET for a specified current waveform using a calculating device, comprising the steps of:

inputting data applicable to a selected power MOSFET into the calculating device;

selecting and inputting said specified current waveform into the calculating device;

calculating the temperature rise profile of the selected power MOSFET based on the inputted data and the selected current waveform.

2. The method of claim 1, wherein the data applicable to the selected power MOSFET includes MOSFET device type.

3. The method of claim 1, wherein the data pertaining to the selected MOSFET includes MOSFET resistance when conducting current at maximum temperature.

4. The method of claim 1, wherein the specified current waveform is selected from a library of waveforms.

5. The method of claim 1, further comprising the step of inputting thermal resistance coordinates.

6. The method of claim 1, further comprising the step of inputting selected waveform parameters to define the waveshape of the selected waveform.

7. The method of claim 1, further comprising the step of inputting the number of intervals required for calculation.

8. The method of claim 7, wherein the temperature rise profile of the selected power MOSFET is calculated by calculating constants to express thermal resistance of the power MOSFET as a function of time.

9. The method of claim 8, wherein the temperature rise profile of the selected power MOSFET is calculated by the further step of calculating an array of values of said thermal resistance for each waveform subdivision defined by the number of intervals selected.

10. The method of claim 9, wherein the temperature rise profile of the selected power MOSFET is calculated by the further step of calculating instantaneous power values at each current/time subdivision defined by the number of intervals selected.

11. The method of claim 10, wherein the temperature rise profile of the selected power MOSFET is calculated by the further step of calculating an array of power X thermal resistance difference terms for the time intervals selected.

12. The method of claim 11, wherein the temperature rise profile of the selected power MOSFET is calculated by the further step of summing all of the power X thermal resistance difference terms in the array.

13. The method of claim 12, wherein the temperature rise profile of the selected power MOSFET is outputted in the form of a graph.

14. The method of claim 12, wherein the temperature rise profile of the selected power MOSFET is outputted in the form of a tabular printout.

* * * * *